United States Patent
Wutzler et al.

(10) Patent No.: US 11,435,253 B2
(45) Date of Patent: Sep. 6, 2022

(54) STEERING DEVICE FOR A MOTOR VEHICLE

(71) Applicant: ZF Automotive Germany GmbH, Alfdorf (DE)

(72) Inventors: Christian Wutzler, Kaarst (DE); Brian Urbach, Rochester Hills, MI (US)

(73) Assignees: ZF Automotive Germany GmbH, Alfdorf (DE); ZF Active Safety and Electronics US LLC, Livonia, MI (US)

( * ) Notice: Subject to any disclaimer, the term of this patent is extended or adjusted under 35 U.S.C. 154(b) by 289 days.

(21) Appl. No.: 16/898,594

(22) Filed: Jun. 11, 2020

(65) Prior Publication Data
US 2020/0393320 A1    Dec. 17, 2020

(30) Foreign Application Priority Data
Jun. 11, 2019   (DE) .......................... 102019115867.2

(51) Int. Cl.
*G01M 3/04*       (2006.01)
*B62D 5/04*       (2006.01)

(52) U.S. Cl.
CPC ........... *G01M 3/045* (2013.01); *B62D 5/0403* (2013.01); *B62D 5/0481* (2013.01)

(58) Field of Classification Search
CPC .... G01M 3/045; B62D 5/0403; B62D 5/0481
See application file for complete search history.

(56) References Cited

U.S. PATENT DOCUMENTS

| | | | |
|---|---|---|---|
| 2,432,367 A | 12/1947 | Andresen | |
| 5,463,377 A | 10/1995 | Kronberg | |
| 2007/0259469 A1 | 11/2007 | Santagato | |
| 2018/0194390 A1* | 7/2018 | Goto | B62D 5/0481 |
| 2018/0312192 A1* | 11/2018 | Beer | B62D 5/0406 |
| 2019/0176872 A1* | 6/2019 | Sato | B62D 5/0481 |

FOREIGN PATENT DOCUMENTS

DE    102006051799 A1    5/2008

\* cited by examiner

*Primary Examiner* — Zoheb S Imtiaz
(74) *Attorney, Agent, or Firm* — Robert James Harwood (57) ABSTRACT

A steering device for a motor vehicle is specified, having a housing and having a liquid sensor, comprising at least two electrical conductors, and at least one bridging element that is movably mounted and that is in a first position in the absence of liquid and is in a second position in the presence of liquid, a flow of current between the at least two electrical conductors being prevented in one of the two positions, and a flow of current between the at least two electrical conductors being enabled in the other of the two positions, and a tripping element made of a liquid-absorbing material that expands upon contact with a liquid and thereby moves the bridging element into the second position, the liquid sensor being arranged at least partially inside the housing.

15 Claims, 11 Drawing Sheets

STEERING DEVICE FOR A MOTOR VEHICLE

CROSS-REFERENCE TO RELATED APPLICATION

This application claims priority to German Patent Application No. 102019115867.2 filed Jun. 11, 2019, the disclosure of which is incorporated herein by reference in its entirety.

TECHNICAL FIELD

The present disclosure relates to a steering device for a motor vehicle, having a liquid sensor.

BACKGROUND

In some closed systems, for example in a steering device for a power-assisted steering, the ingress of water can cause damage, in particular because of the corrosion caused by the water, electrical failures or other mechanical problems.

In a steering device, ingress of water occurs, for example, when the seals that seal the steering device to the outside become damaged, for instance by stone chips. The water that has entered the steering gear can freeze and block the movement of mechanical components. Furthermore, the corrosion caused by the ingress of water can lead to increased friction in the steering device, which can also cause the steering device to fail.

In order to avoid failures of the steering device, it is known to detect the friction during operation of the steering device by means of a friction recognition software, and to use the friction values to deduce ingress of water that has already occurred.

However, this detection method is very imprecise and can only identify water ingress when corrosion has already occurred. Since measurable corrosion is only present a certain time after the ingress of water, there is a risk that in the meantime, i.e. before the ingress of water is detected, further damage may occur, for example to electronic components. This can lead to a failure of the steering device, and thus to a failure of the power steering assistance.

SUMMARY

It is therefore an object of the present disclosure to provide a steering device in which ingress of liquid is identified at an early stage.

This object is achieved according to the present disclosure by a steering device for a motor vehicle, having a hollow housing and having a liquid sensor, comprising at least two electrical conductors, and at least one bridging element that is movably mounted and that is in a first position in the absence of liquid and is in a second position in the presence of liquid, a flow of current between the at least two electrical conductors being prevented in one of the two positions, and a flow of current between the at least two electrical conductors being enabled in the other of the two positions, and a tripping element made of a liquid-absorbing material that expands upon contact with a liquid and thereby moves the bridging element into the second position, the liquid sensor being arranged at least partially inside the housing.

The liquid sensor can thus detect the presence of liquid, and the flow of current between the two conductors can be used to measure whether there has been an ingress of water. Depending on how the bridging element is connected, an ingress of water may be signaled by a closed circuit or a broken circuit.

Since the presence of liquid can be detected on the basis of the position of the bridging element, ingress of water can be detected particularly reliably in the case of the steering device according to the present disclosure. This is because it can be clearly determined whether or not there is a flow of current through the two electrical conductors. In the case of the known liquid sensors, a flow of current between two electrodes occurs, for example, via a liquid itself. However, the electrical currents flowing in this case are very small, which means that the accuracy of such sensors is also insufficient.

The electrical conductors are connected, for example, to a control unit, which emits a warning signal when ingress of water has been detected. A user can be informed, for example by illumination of a signal lamp, that repair or servicing is necessary.

One of the two electrical conductors is, for example, a signal contact, and the at least one other electrical conductor is a measuring conductor.

The liquid sensor is preferably mounted directly on the housing of the steering device.

In order to expand the tripping element to such an extent that the bridging element can move into the second position, a certain minimum quantity of liquid is preferably required. This is achieved in that the tripping element has a certain volume, and the bridging element must cover a defined distance to move from the first position into the second position. In the case of very small quantities of liquid, the tripping element can expand a little, but not enough to move the bridging element into the second position. Consequently, the liquid sensor will not detect the presence of liquid if the quantity of liquid is negligible. In other words, the liquid sensor has the advantage over an electrical sensor that the tripping element acts as a fuse and can prevent a false alarm. Only when there is so much liquid present that a failure of a monitored system such as, for example, the steering system, is actually to be expected, is the trigger element sufficiently expanded, and a warning signal is emitted. Also, fluctuations of the air humidity in the region of the liquid sensor are not detected.

A liquid that can expand the tripping element is, for example, water, even dirty or salty water. However, the liquid sensor may also detect other liquids, such as liquids containing oil.

The bridging element lies against, in particular, the tripping material, such that the bridging element is immediately moved upon expansion of the tripping element.

The liquid-absorbing material of the tripping element is, for example, a hydrogel, in particular a polyacrylamide, a polyvinylpyrrolidone, an amylopectin, gelatin, cellulose or a copolymer.

Upon contact with a liquid, the liquid-absorbing material of the triggering element may, for example, double its volume.

The liquid sensor may comprise a spring element that applies a spring force to the bridging element in the direction of the first position, the spring element preferably being an electrical conductor for state sensing. In the absence of moisture, the spring element reliably holds the bridging element in the first position, such that a false alarm of the liquid sensor is reliably prevented. Since the spring element is simultaneously an electrical conductor for state sensing, the steering device, in particular the liquid sensor, can comprise particularly few components and be particularly compact. The spring element is, for example, a coil spring.

According to one embodiment, the spring element is embedded in the tripping element, in particular in the liquid-absorbing material. The spring element is thereby protected to a certain extent against corrosion, as long as there has been no ingress of liquid.

The tripping element and/or the bridging element may be disk-shaped. In particular, the tripping element and the bridging element are congruent in plan view. The tripping element and/or the bridging element can thus be manufactured easily and economically, for example as stamped parts.

The disk-shaped bridging element may be planar or curved.

The liquid sensor may have a cage surrounding the tripping element, the tripping element being accommodated, in particular, in the cage. To allow water to reach the absorbing material, the cage has cutouts, for example. The cage guides the expansion of the tripping element in a direction, since the cage prevents, or at least limits, expansion in the radial direction. Thus, in the presence of water, the bridging element is moved selectively in a direction from the first position to the second position. In particular, the cage is cylindrical.

The bridging element is preferably positioned in the first position on the cage. In this case, the bridging element is drawn toward the cage by the spring element, for example. In this way, the bridging element is arranged in a defined orientation in the first position.

According to one embodiment, the liquid sensor comprises a contact cap, made of an electrically conductive material, that is in direct contact with one of the electrical conductors or realized integrally therewith, the tripping element, upon the absorption of liquid, being able to press the bridging element against the contact cap. In this way, a reliable electrical contact can be established between the contact cap and the bridging element. For this purpose, the bridging element is preferably mounted inside the contact cap.

The contact cap surrounds the cage, in particular radially, which also contributes to a compact design of the liquid sensor.

The bridging element and one of the electrical conductors may be connected to each other by means of a flexible electrical conductor. This allows the bridging element to move in an axial direction without the contact to the signal conductor being interrupted. The flexible conductor may be a spring element, as described above, or a wire.

A contact tab, to which the flexible electrical conductor can be fastened, may be provided on the bridging element. The flexible electrical conductor can thus be reliably connected to the bridging element, such that the electrical conductor cannot become unintentionally detached, even if the bridging element moves.

The liquid sensor may have an additional conductor element that electrically connects the bridging element, in the first position, to one of the electrical conductors, the conductor element being interrupted when the bridging element moves from the first position into the second position. As long as the bridging element is in the first position, a flow of current between the at least two electrical conductors is thus possible. The breaking of the conductor element causes a flow of current to be interrupted, thereby allowing an ingress of water be ascertained.

According to one embodiment, a test conductor is provided, the bridging element, in the first position, electrically connecting the test conductor and one of the at least two electrical conductors to each other. The test conductor serves to apply test current to the liquid sensor. This means that, even if no liquid is present, there is a continuous current path in the liquid sensor. The test conductor can be used to check whether the liquid sensor is in working order. For example, the application of test current can be used to exclude the possibility that contacts are corroded or that conductors are loose or missing. To keep power consumption low, the test conductor is preferably only in operation during a system check and/or a quality test. Other electrically conductive elements, for example the cage in which the tripping element is accommodated, may also be interposed between the test conductor and the bridging element.

The cage may be in direct contact with the test conductor, or be formed integrally therewith. If the bridging element is arranged in the first position on the cage, in particular is in contact with it, there is thus a closed current path, via the cage, from the bridging element to the test conductor.

According to one embodiment, the test conductor is a stamped part having a bent-up tab, the tab being in contact with the bridging element when the bridging element is in the first position, at least one cutout being provided in the tripping element, and the tab extending through the cutout. The bridging element can thus rest loosely on the test conductor when the bridging element is in the first position. When the bridging element moves away from the first position, in particular due to an expansion of the tripping element, the bridging element is lifted from the test conductor, such that the electrical connection between the bridging element and the test conductor is interrupted.

For the purpose of being fixed in place, the liquid sensor may comprise a retainer that has an adhesive surface, a latching element or a thread. Such a retainer allows the liquid sensor to be easily and reliably mounted in a system to be monitored.

The cage and/or contact cap lie/lies, for example, against the holding means. This allows the cage and/or the contact cap to be arranged in a defined position in the liquid sensor.

Relative to the steering device in its installed state, the liquid sensor is arranged at the lowest point of the housing. This is where any liquid that enters collects, such that the liquid sensor can detect ingress of liquid at an early stage.

BRIEF DESCRIPTION OF THE DRAWINGS

Further advantages and features of the present disclosure are given by the following description and by the following drawings, to which reference is made. There are shown in the drawings.

DETAILED DESCRIPTION

Figure 1:
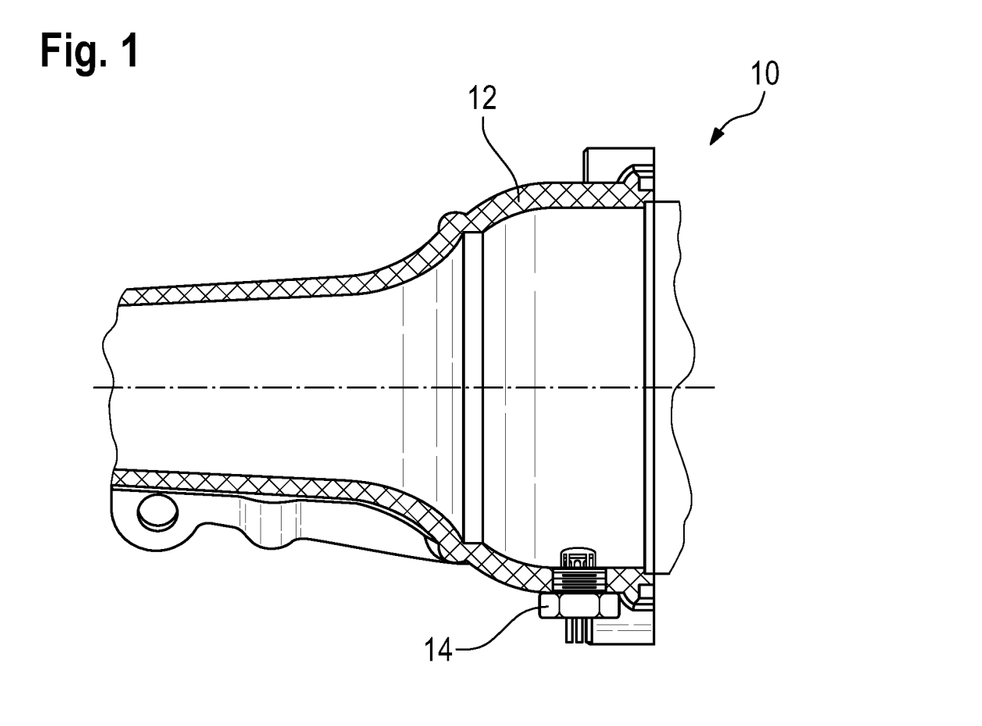
FIG. 1 shows a steering device according to the present disclosure, having a liquid sensor.

FIG. 1 shows a steering device 10 according to the present disclosure for a motor vehicle. The steering device 10 comprises a hollow housing 12, and a liquid sensor 14, which is mounted partially inside the housing 12.

The presence of water or other liquid in the steering device 10 can be detected by means of the liquid sensor 14.

For this purpose, the liquid sensor 14 is mounted at the lowest point in the housing 12, where liquid that has entered the steering device 10 collects.

If water ingress has been ascertained, a warning signal is emitted to a vehicle passenger, with the instruction to visit a vehicle service station and/or to stop the vehicle.

Figure 2:
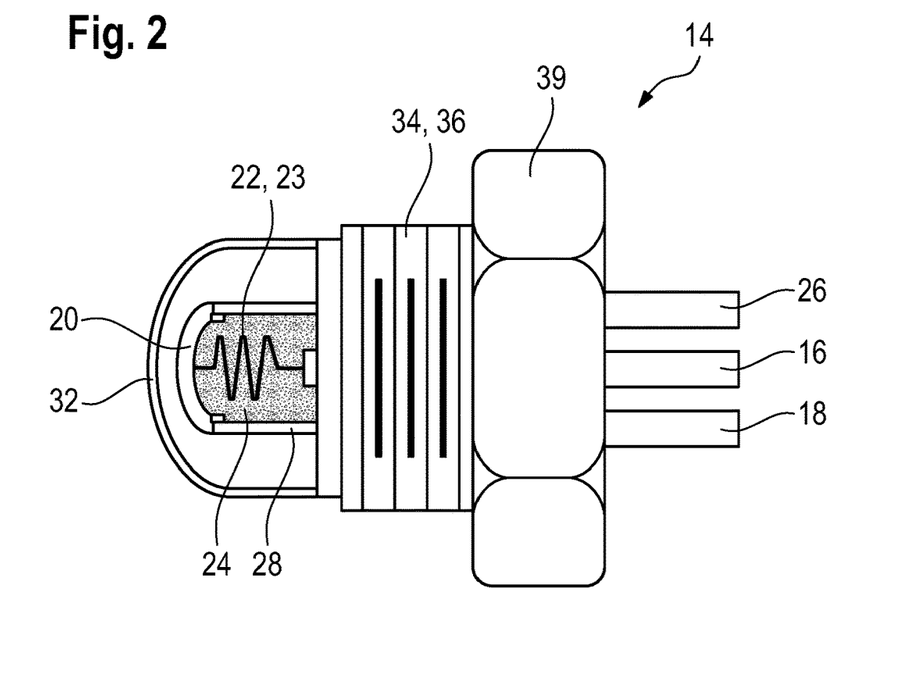
FIG. 2 shows a liquid sensor for a steering device according to the present disclosure according to a first embodiment, in a non-tripped state.

FIG. 2 shows a liquid sensor 14 according to a first embodiment, in a non-tripped state, i.e. in the absence of liquid. The liquid sensor 14 is suitable, in particular, for use in the steering device 10 according to the present disclosure.

The liquid sensor 14 comprises two electrical conductors 16, 18 that can be connected to a circuit or controller, and a bridging element 20. The bridging element 20 may also be regarded as a switch that can open or close a current path between the electrical conductors 16, 18.

The bridging element 20 is movably mounted. More precisely, the bridging element 20 is mounted so as to be displaceable in the liquid sensor 14.

In the absence of liquid, the bridging element 20 is in a first position, as shown in FIG. 2, In the case of the embodiment represented, a flow of current between the at least two electrical conductors 16, 18 is prevented when the bridging element 20 is in the first position. In particular, the bridging element 20 is connected to one of the two electrical conductors 16 when the bridging element 20 is in the first position, and is spaced apart from the other electrical conductor 18.

The first conductor 16 is, for example, a chassis ground contact, and the second conductor 18 is a signal contact.

To enable the bridging element 20 to move from a first position into a second position, the first conductor 16 comprises a flexible electrical conductor 22. In the case of the embodiment represented in FIG. 2, the flexible electrical conductor 22 is a spring element 23, in particular a coil spring.

The spring element 23 may exert a bias upon the bridging element 20 and hold it, with a defined force, in the first position.

Figure 3:
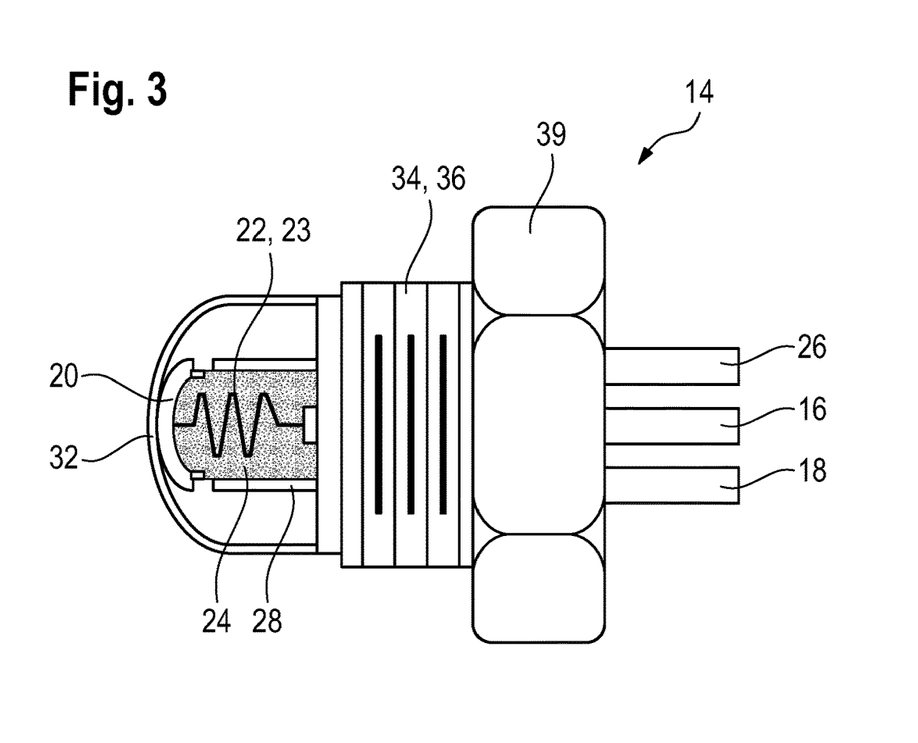
FIG. 3 shows the liquid sensor from FIG. 2, in a tripped state.

In the presence of liquid, the bridging element 20 is moved, in particular contrary to the biasing force of the spring 23, from the first position into a second position, which is shown in FIG. 3. In the second position, a flow of current is possible between the two electrical conductors 16, 18, since the bridging element 20 is electrically connected to the electrical conductor 18.

In order to move the bridging element 20 from the first position into the second position, the liquid sensor 14 comprises a tripping element 24. The tripping element 24 is made of a liquid-absorbing material that expands upon contact with liquid. This is illustrated in FIGS. 2 and 3, with FIG. 3 showing the tripping element 24 in an expanded state, in comparison with FIG. 2.

In the exemplary embodiment shown, the flexible conductor 22 is embedded in the tripping element 24. When the bridging element 20 is displaced by the expansion of the tripping element 24, the flexible conductor 22 becomes stretched.

In addition to the two electrical conductors 16, 18, the liquid sensor 14 comprises a test conductor 26, the bridging element 20, in the first position, electrically connecting the test conductor 26 and the electrical conductor 16 to each other. The test conductor 26 serves, by means of application of current to the liquid sensor 14, to ascertain whether the liquid sensor 14 is in working order.

In order to guide the expansion of the tripping element 24 in a direction in a controlled manner, the liquid sensor 14 has a cage 28 surrounding the tripping element 24.

Figure 4:
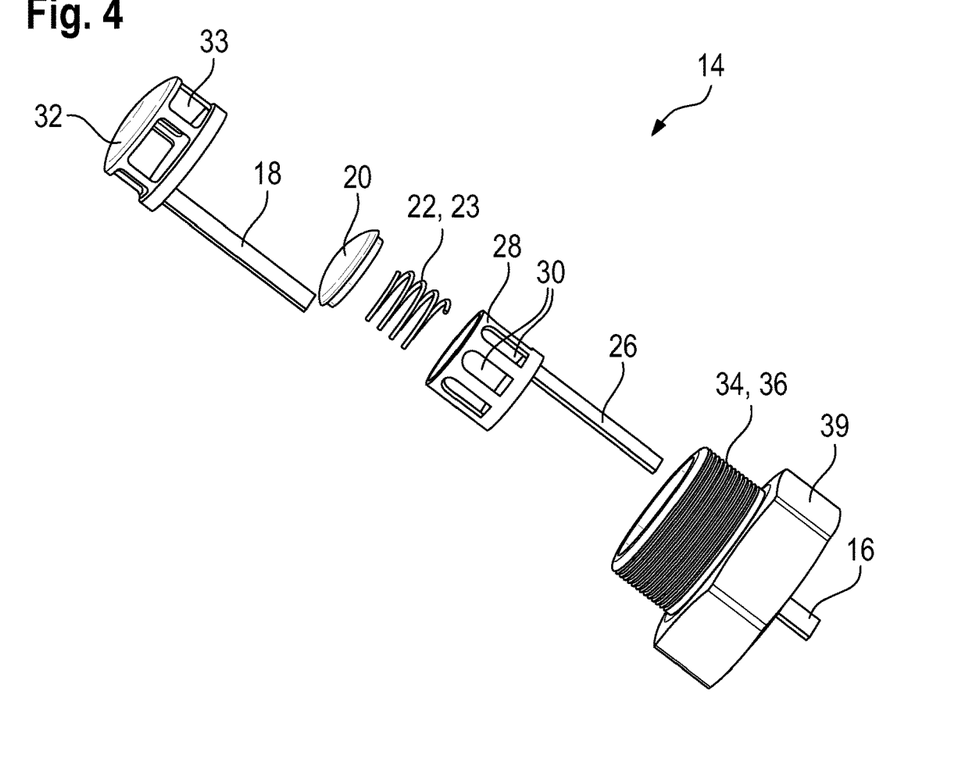
FIG. 4 shows a first view of the liquid sensor from FIG. 2, in an exploded representation in each case.
Figure 5:
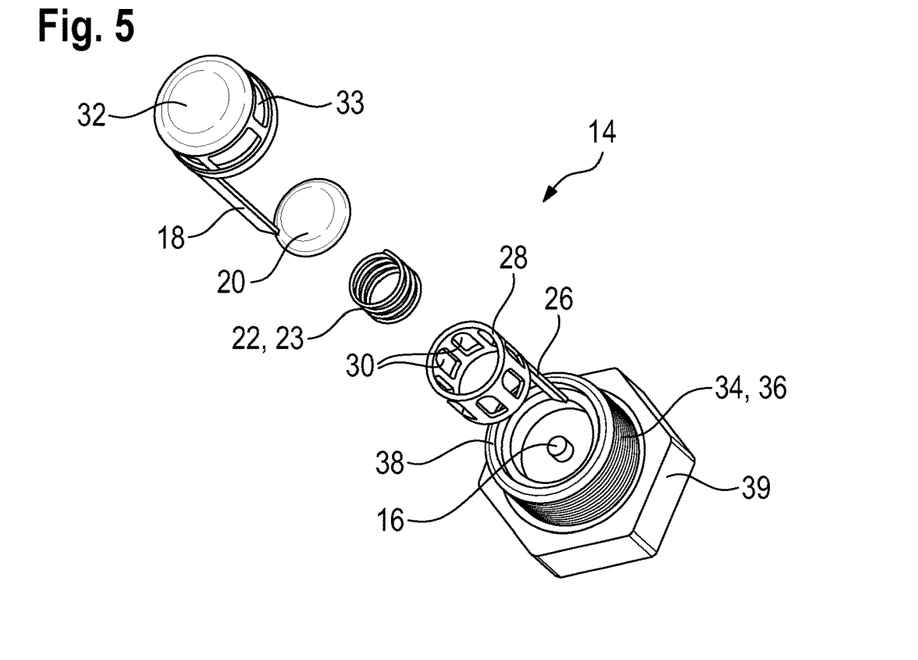
FIG. 5 shows a second view of the liquid sensor from FIG. 2, in an exploded representation in each case.

The shape of the cage 28 can be seen in detail in FIGS. 4 and 5, which each show an exploded representation of the liquid sensor 14 represented in FIGS. 2 and 3. In particular, the cage 28 is in the shape of a cylindrical sleeve, having cutouts 30 through which liquid can reach the tripping element 24.

In the exemplary embodiment represented, the cage 28 is realized integrally with the test conductor 26. However, the two components may also be realized separately from each other. In both cases the cage 28 and the test conductor 26 are connected to each other in an electrically conductive manner.

When the bridging element 20 is in the first position, it rests on the cage 28. The bridging element 20 is thus in direct contact with the test conductor 26 if the latter is realized integrally with the cage 28.

The spring element 23 in this case can apply a biasing force to the bridging element 20, toward the cage 28 and, in the absence of liquid, hold the bridging element 20 in bearing contact with the test conductor 26.

The liquid sensor 14 furthermore comprises a contact cap 32, made of an electrically conductive material, that is in direct contact with the electrical conductor 18 or realized integrally therewith. The contact cap 32 closes off the liquid sensor 14 in one direction.

The contact cap 32 likewise comprises cutouts 33 to enable liquid to enter the liquid sensor 14.

When the tripping element 24 expands upon the absorption of liquid, the tripping element 24 presses the bridging element 20 against the contact cap 32, and thus establishes electrical contact between the bridging element 20 and the electrical conductor 18. In this state, which is illustrated in FIG. 3, a flow of current is possible between the two conductors 16, 18 via the bridging element 20.

Figure 6:
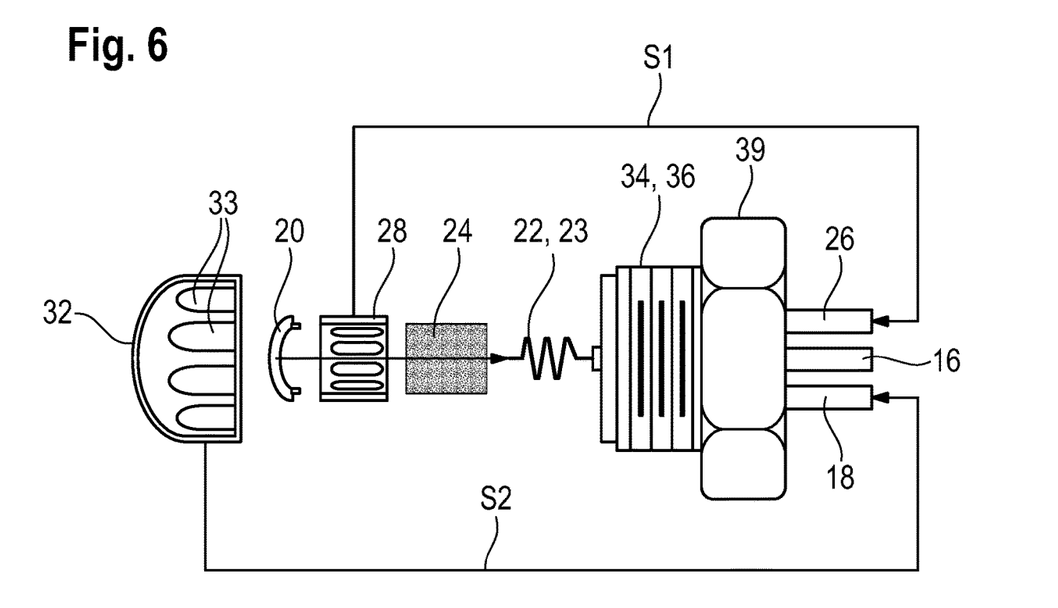
FIG. 6 shows a further exploded representation of the liquid sensor from FIG. 2.

The possible current paths S1, S2 through the liquid sensor 14 are additionally illustrated in FIG. 6. The current path S1 is closed when the bridging element 20 is in the first position and runs, via the conductor 16 and the bridging element 20, to the test conductor 26. The current path S2 is closed when the bridging element 20 is in the second position and runs, via the conductor 6 and the bridging element 20, to the electrical conductor 18.

The liquid sensor 14 is connected, for example, to a control unit, not represented, the control unit being able to ascertain, on the basis of the flow of current through the liquid sensor 14, i.e. through the electrical conductors 16, 18, whether or not water has entered the steering device 10.

In order to fix the liquid sensor 14 to the housing 12 of the steering device 10, the liquid sensor 14 has a retainer 34. In the exemplary embodiment represented, the retainer 34 comprises a thread 36, by means of which the liquid sensor 14 can be directly screw-connected in the housing 12 of the steering device, as represented in FIG. 1.

However, the retainer 34 may also have other fastening means, for example an adhesive surface or a latching element.

It can be seen in FIG. 5 that the thread 36 is part of a threaded sleeve 38, the electrical conductors 16, 18, 26 extending through the threaded sleeve 38.

To simplify the fitting of the liquid sensor 14, a hexagonal portion 39 is provided. In particular, this allows the liquid sensor 14 to be fitted by use of a hexagon wrench or other suitable tool.

Figure 7:
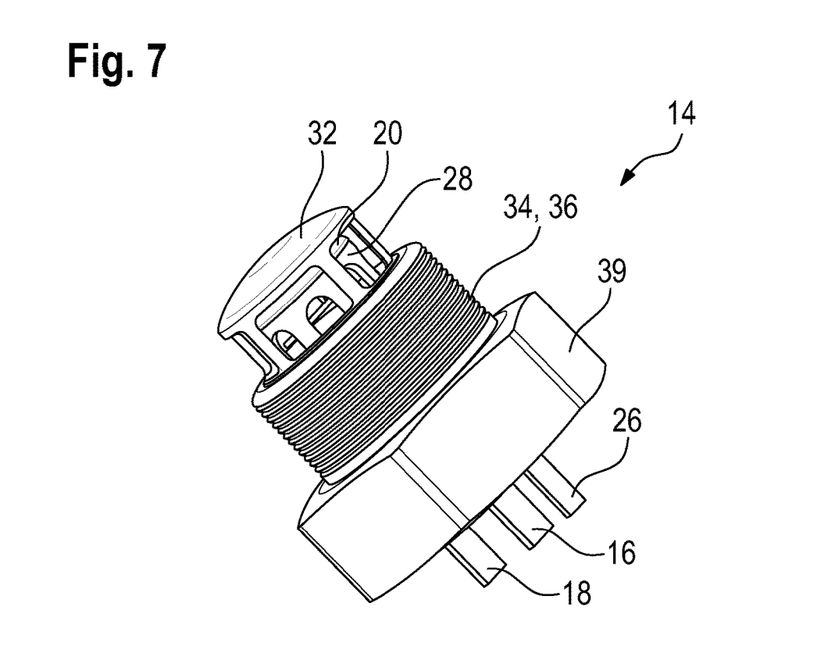
FIG. 7 shows the liquid sensor from FIG. 2, in a perspective view.

FIG. 7 shows the liquid sensor 14 from FIGS. 2 to 6, in a perspective view.

Figure 8:
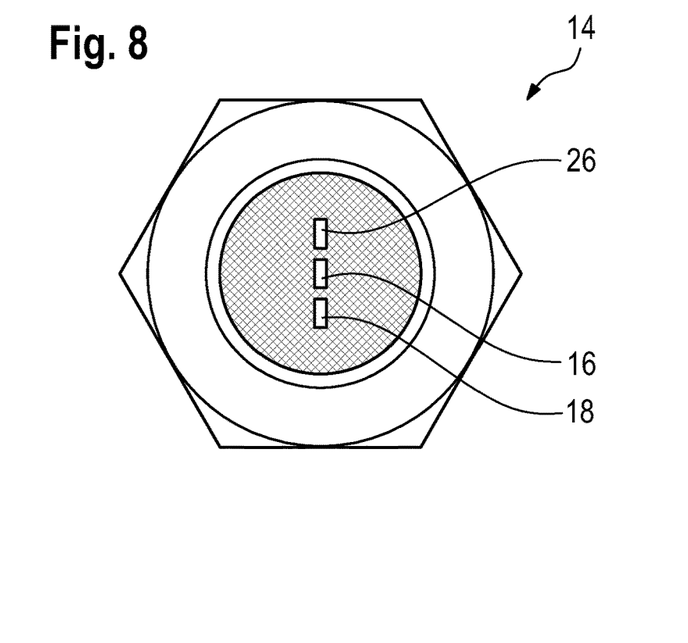
FIG. 8 shows a bottom view of the liquid sensor from FIG. 2.

FIG. 8 shows a cross section through the liquid sensor 14.

The liquid sensor 14 can only be used once. Once the liquid sensor 14 has been tripped, it must be replaced.

Figure 9:
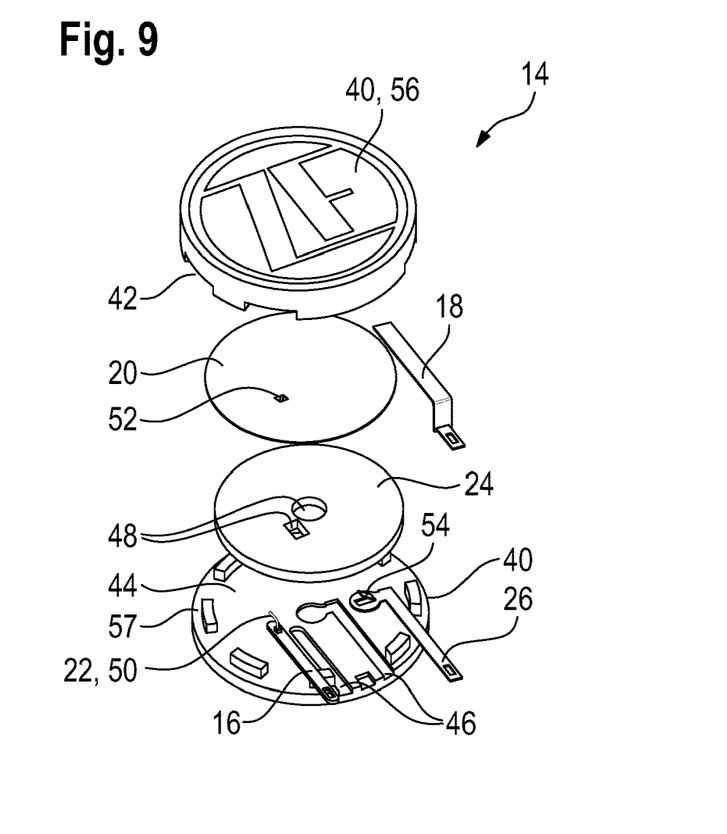
FIG. 9 shows a further liquid sensor for a steering device according to the present disclosure, in an exploded representation.

Illustrated in an exploded representation in FIG. 9 is a liquid sensor 14 for a steering device 10 according to the present disclosure, according to a further embodiment.

In the following, the same reference numerals are used for identical structures, having identical functions, that are known from the above embodiment, and to that extent reference is made to the preceding explanations and, in order to avoid repetitions, the following explains the differences between the respective embodiments.

The liquid sensor 14 as shown in FIG. 9 has a two-part housing 40, having a cover 56, and having a base part 57, in which inlet openings 42 are provided, through which liquid can enter the interior of the housing 40.

Arranged on an inner base 44 of the housing 40 are an electrical conductor 16 and a test conductor 26, the conductors 16, 26 each respectively being embedded in a depression 46 in the inner base 44 of the housing 40. The depressions 46, however, are optional.

Figure 14:
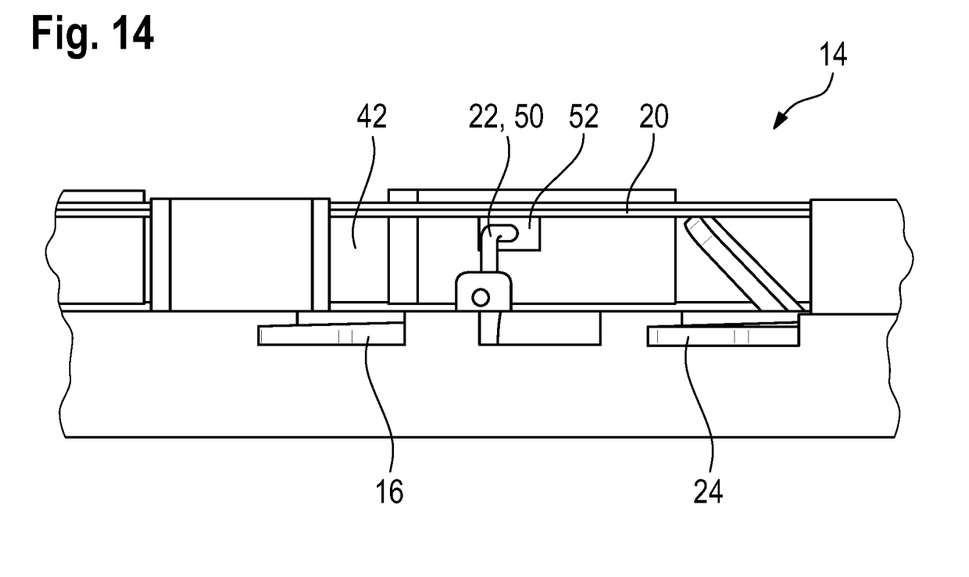
FIG. 14 shows a side view of the liquid sensor from FIG. 9.

The electrical conductor 16 and the test conductor 26 extend by a short distance out of the housing 40, as can be seen, for example in FIG. 14, in order to simplify electrical contacting of conductors 16, 26.

Arranged on the inner base 44 of the housing 40 is a disk-shaped tripping element 24 made of a liquid-absorbing material, and resting thereon, in turn, in particular congruently, is a likewise disk-shaped bridging element 20. The tripping element 24 has a thickness of, for example, 10 mm, in particular 7 mm.

Arranged in the tripping element 24 are two cutouts 48, via which the bridging element 20 can be in contact with the electrical conductors 16, 26 when the bridging element 20 is in the first position.

For this purpose, the electrical conductor 16, which constitutes the chassis ground conductor, comprises a flexible electrical conductor 22, in particular a wire 50, which is fastened at one end to the bridging element 20 and remains in contact with the bridging element 20 even if the latter is moved into the second position.

Figure 13:
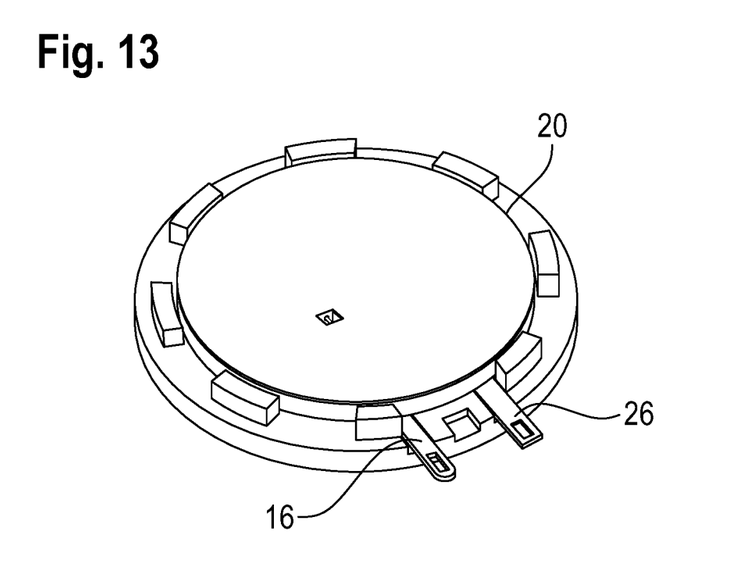
FIG. 13 is a fourth view of an intermediate product in the production of the liquid sensor from FIG. 9
Figure 15:
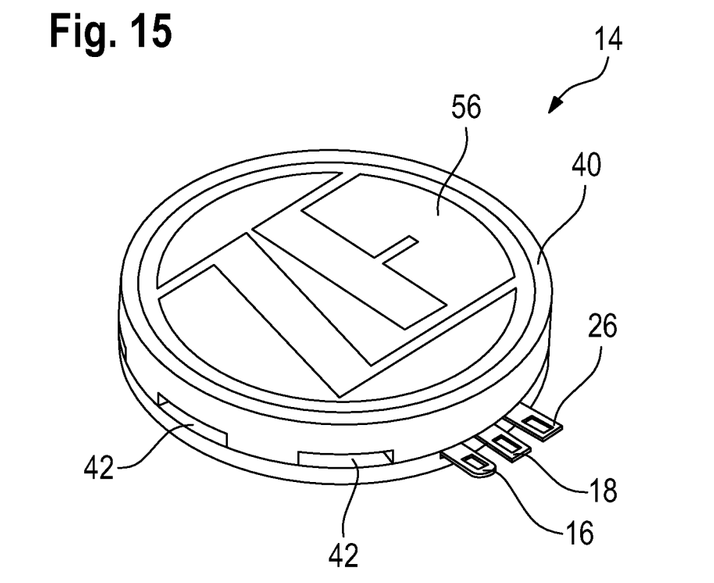
FIG. 15 shows the liquid sensor from FIG. 9, in the assembled state.

For this purpose, a tab 52, which is shown more clearly in FIGS. 13 and 15, is provided on the bridging element 20. The flexible electrical conductor 22 is fastened to the tab 52.

The flexible electrical conductor 22 in this case extends through one of the cutouts 48 in the tripping element 24.

In the exemplary embodiment illustrated in FIG. 9, the test conductor 26 is a stamped part having a bent-up tab 54, the tab 54 likewise extending through one of the cutouts 48.

Figure 10:
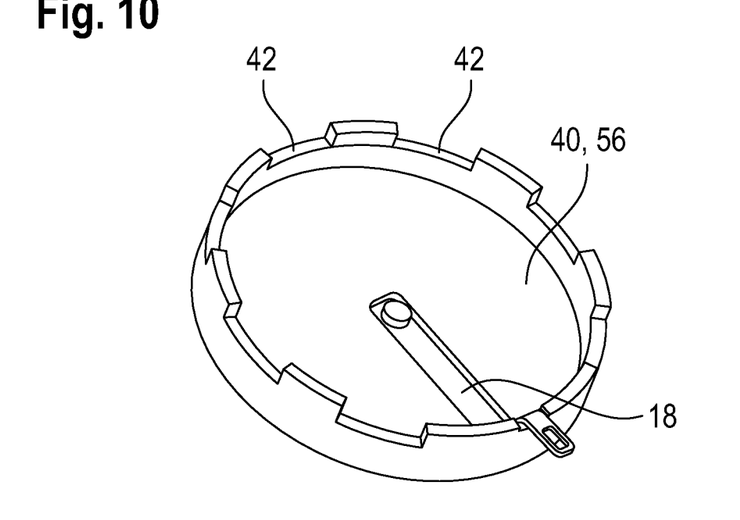
FIG. 10 is a first view of an intermediate product in the production of the liquid sensor from FIG. 9.
Figure 11:
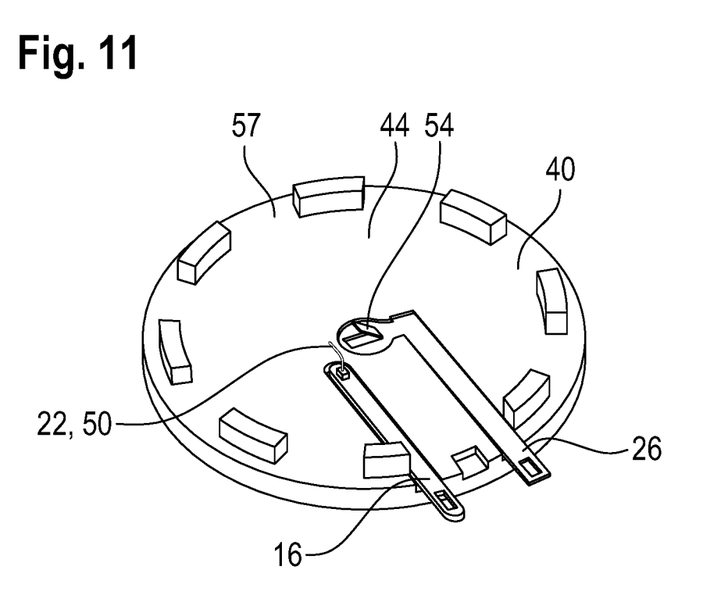
FIG. 11 is a second view of an intermediate product in the production of the liquid sensor from FIG. 9.
Figure 12:
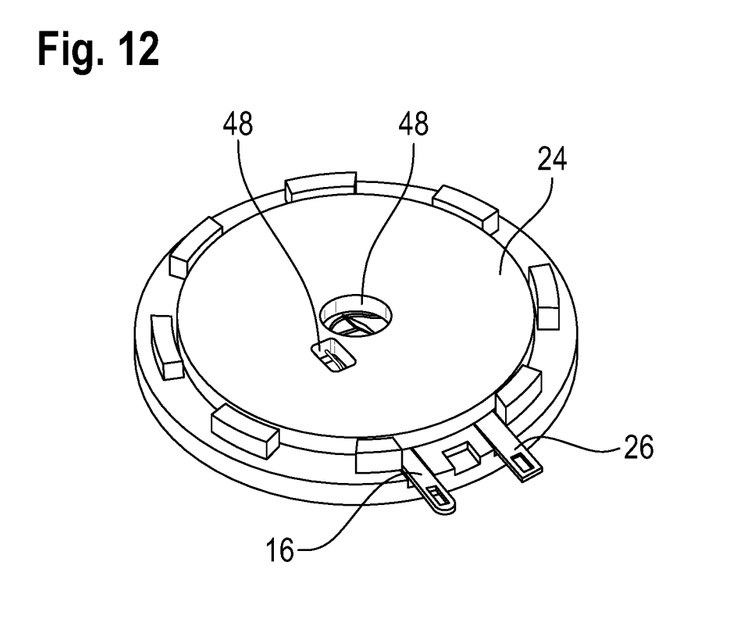
FIG. 12 is a third view of an intermediate product in the production of the liquid sensor from FIG. 9.

A further electrical conductor 18, which constitutes the signal contact, is arranged on the cover 56 of the two-part housing 40, as can be seen in FIG. 10.

FIGS. 10 to 13 each show intermediate products in the production of the liquid sensor 14.

FIG. 14 shows the liquid sensor 14 from FIG. 9 in a side view, with the tripping element 24 and the cover 56 concealed for greater clarity of illustration. The fastening of the flexible electrical conductor 22 to the tab 52 of the bridging element 20, and the contact between the test conductor 26 and the bridging element 20, are thus more clearly visible in FIG. 13.

In FIG. 14 the bridging element 20 is shown in the first position. In the presence of liquid, the bridging element 20 is lifted by the expanding tripping element 24 and pressed against an inner face of the cover 56, an electrical contact being established between the bridging element 20 and the electrical conductor 18, enabling the presence of liquid to be detected.

The contact between the bridging element 20 and the test conductor 26 is broken as soon as the bridging element 20 is moved from the first position toward the second position.

FIG. 15 shows the liquid sensor 14 from FIG. 9 in an assembled state. In this case, the cover 56 and the base part 57 are connected to each other by a clamping connection. This makes the liquid sensor 14 particularly easy to assemble. However, it is also possible for the cover 56 and the base part 57 to be glued together or screw-connected.

Figure 16:
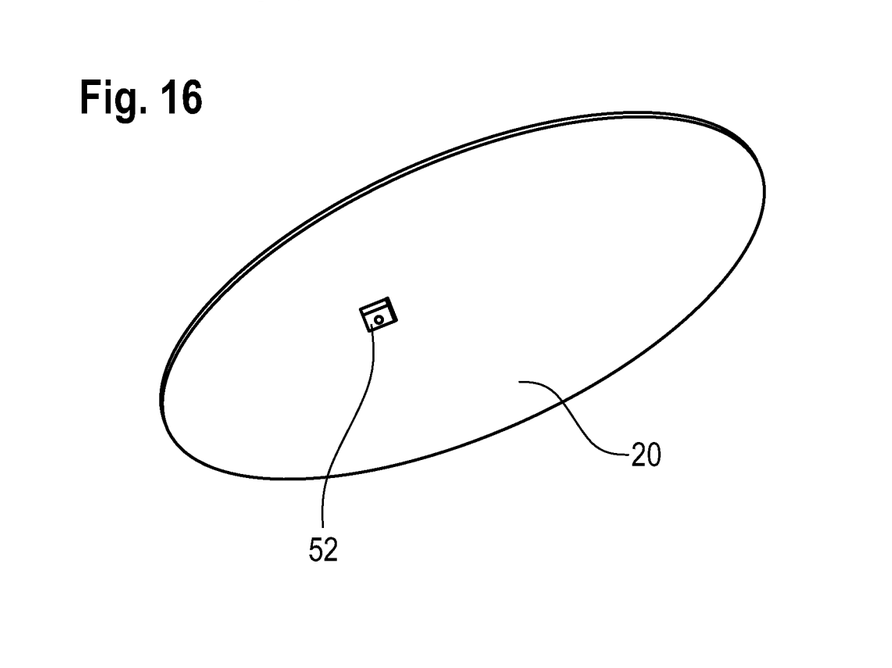
FIG. 16 shows a bridging element of the liquid sensor according to FIG. 9, in a detail view.

FIG. 16 shows the bridging element 20 in a detail view. In particular, the tab 52 bent out of the bridging element 20 is clearly visible in FIG. 16.

A further embodiment of a liquid sensor is illustrated in FIGS. 17 to 20.

Unlike the previously explained embodiments, in the case of this embodiment the presence of liquid is ascertained on the basis of a broken electrical circuit.

Figure 17:
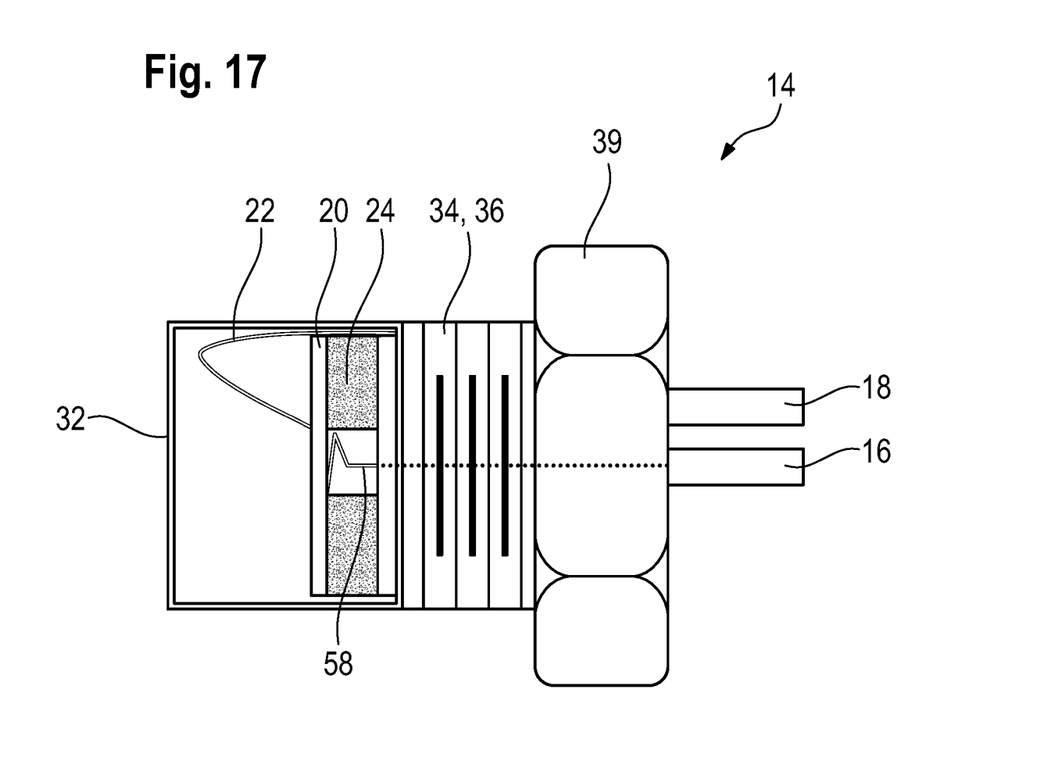
FIG. 17 shows a liquid sensor according to a further embodiment according to the present disclosure, in a non-tripped state.

FIG. 17 shows the liquid sensor 14 in a non-tripped state. In this case, the bridging element 20 is in the first position.

In this state, the bridging element 20 is connected to the electrical conductor 18, on the one hand, via a flexible electrical conductor 22, in particular a wire.

In addition, the bridging element 20 is connected to the electrical conductor 16 via an additional conductor element 58. An end of the conductor element 58 that is spaced apart from the electrical conductor 18 is in this case fixedly connected to the bridging element 20.

In the case of the state represented in FIG. 17, a flow of current is possible between the electrical conductors 16, 18. As along as this is the case, no significant ingress of water has occurred.

Figure 18:
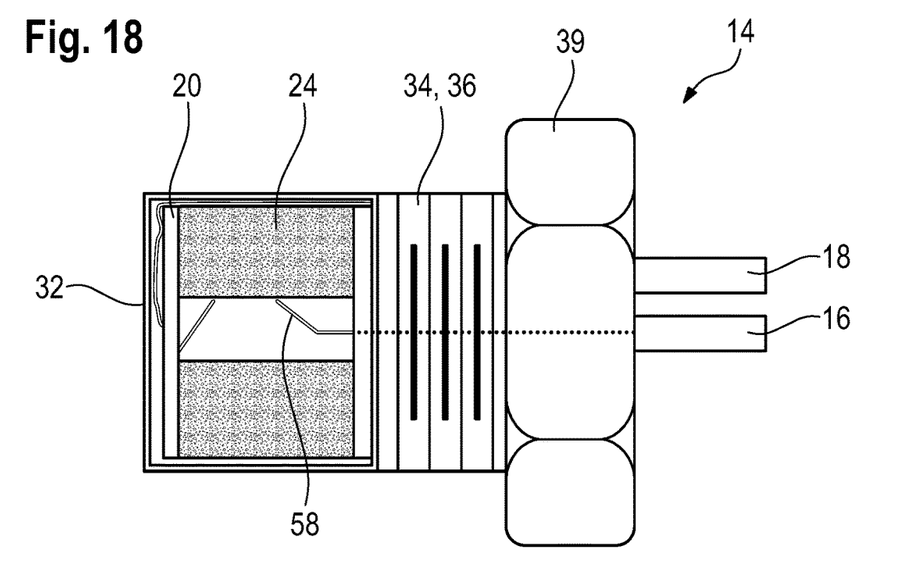
FIG. 18 shows the liquid sensor from FIG. 17, in a triggered state.

FIG. 18 shows the liquid sensor 14 from FIG. 17 in a tripped state. In this case, the bridging element 20 has been moved into the second position by the expansion of the tripping element 24.

The conductor element 58 has been interrupted by the movement of the bridging element 20 from the first position into the second position, such that, in the tripped state, a flow of current between the electrical conductors 16, 18 is prevented.

For this purpose, the conductor element 58 has, for example, a region 62 of reduced strength. The region 62 may be a point or a section along the conductor element 58.

In particular, the region 62 of reduced strength is such that current can reliably flow through the conductor element 58 when the bridging element 20 is in the first position, and the conductor element 58 can be interrupted so easily that the bridging element 20 is not restrained in the first position by the conductor element 58 upon expansion of the tripping element 24.

The region 62 of reduced strength is, for example, a region in which a cross section of the conductor element 58 is reduced in comparison with the cross section in the rest of the conductor element 58, for example by means of a notch.

The conductor element 58 in this case may be somewhat flexible, to the extent that a slight expansion of the tripping element 24 is possible without interrupting the flow of current. This prevents ingress of water being detected in the case of just very small amounts of water.

It is also conceivable that the reduced strength is achieved in that the conductor element 58 is in two parts and, in order to create a closed circuit, the two parts 58a, 58b of the conductor element 58 only lie loosely against each other. In this case, however, the flow of current is interrupted even in the case of a slight expansion of the tripping element 24.

Figure 19:
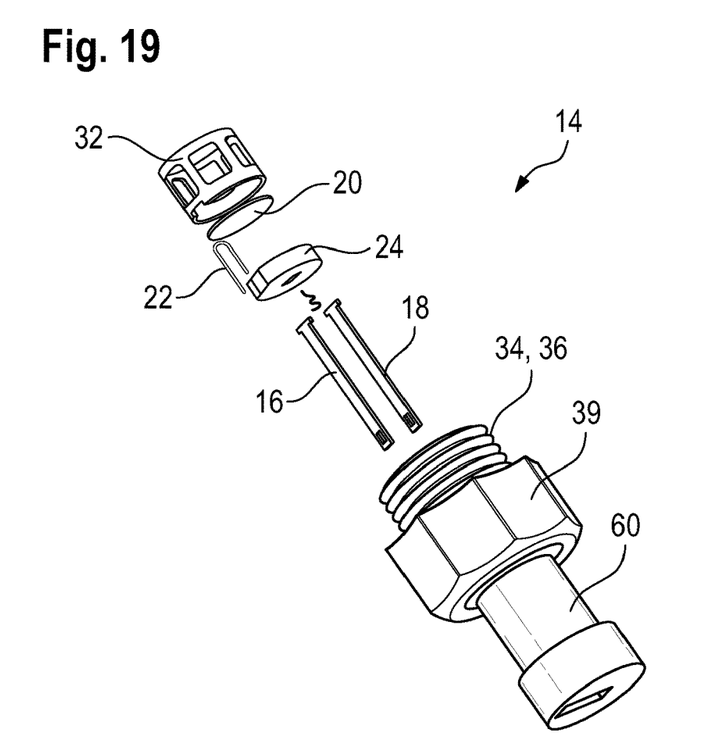
FIG. 19 shows an exploded representation of the liquid sensor from FIGS. 17 and 18.

FIG. 19 shows the liquid sensor 14 from FIGS. 17 and 18 in an exploded representation. This representation shows an insulation element 60, in which the electrical conductors 16, 18 are embedded, and thus insulated from each other.

Figure 20:
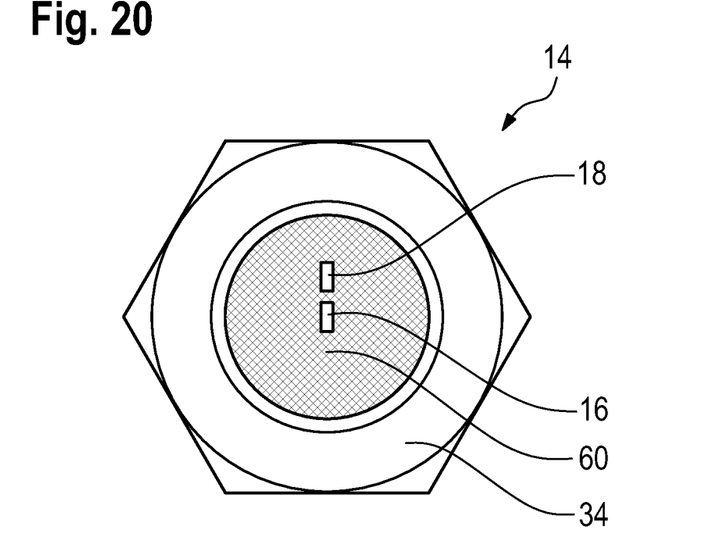
FIG. 20 shows a bottom view of the liquid sensor according to FIGS. 17 to 19.

FIG. 20 shows a cross section through the liquid sensor 14 according to FIGS. 17 to 19.

In the case of the embodiment according to FIGS. 17 to 20, the contact cap 32 does not necessarily have to be made of an electrically conductive material, since in the case of this embodiment it has a purely mechanical function. In particular, the contact cap 32 forms a stop for the bridging element 20 when the latter is in the second position.

What is claimed is:

1. A steering device for a motor vehicle, having a hollow housing and having a liquid sensor, comprising at least two electrical conductors, and at least one bridging element that is movably mounted and that is in a first position in the absence of liquid and is in a second position in the presence of liquid, a flow of current between the at least two electrical conductors being prevented in one of the two positions, and a flow of current between the at least two electrical conductors being enabled in the other of the two positions, and a tripping element made of a liquid-absorbing material that expands upon contact with a liquid and thereby moves the bridging element into the second position, the liquid sensor being arranged at least partially inside the housing.

2. The steering device as defined in claim 1, wherein the liquid sensor comprises a spring element that applies a spring force to the bridging element in the direction of the first position, the spring element preferably being an electrical conductor for state sensing.

3. The steering device as defined in claim 2, wherein the spring element is embedded in the tripping element, in particular in the liquid-absorbing material.

4. The steering device as defined in claim 3, wherein the tripping element and/or the bridging element is disk-shaped.

5. The steering device as defined in claim 4, wherein the liquid sensor has a cage surrounding the tripping element, the tripping element being accommodated, in particular, in the cage.

6. The steering device as defined in claim 5, wherein the bridging element is positioned in the first position on the cage.

7. The steering device as defined in claim 1, wherein the liquid sensor comprises a contact cap, made of an electrically conductive material, that is in direct contact with one of the electrical conductors or realized integrally therewith, and the tripping element, upon the absorption of liquid, being able to press the bridging element against the contact cap.

8. The steering device as defined in claim 7 to each other by means of a flexible electrical conductor.

9. The steering device as defined in claim 8, wherein a contact tab, to which the flexible electrical conductor can be fastened, is provided on the bridging element.

10. The steering device as defined in claim 8, wherein the liquid sensor has an additional conductor element that electrically connects the bridging element, in the first position, to one of the electrical conductors, the conductor element being interrupted when the bridging element moves from the first position into the second position.

11. The steering device as defined in claim 10, wherein a test conductor is provided, the bridging element, in the first position, electrically connecting the test conductor and one of the at least two electrical conductors to each other.

12. The steering device as defined in claim 11, wherein the cage is in direct contact with the test conductor, or is formed integrally therewith.

13. The steering device as defined in claim 11, wherein the test conductor is a stamped part having a bent-up tab, the tab being in contact with the bridging element when the bridging element is in the first position, at least one cutout being provided in the tripping element, and the tab extending through the cutout.

14. The steering device as defined in claim 13, wherein, for the purpose of being fixed in place, the liquid sensor comprises a retainer that has an adhesive surface, a latching element or a thread.

15. The steering device as defined in claim 14, wherein the liquid sensor is arranged at the lowest point of the housing.

* * * * *